(12) United States Patent
Greb et al.

(10) Patent No.: US 6,609,850 B2
(45) Date of Patent: Aug. 26, 2003

(54) BALL JOINT ASSEMBLY FOR A PISTON-AND CYLINDER UNIT

(75) Inventors: Oliver Greb, Neunkirchen (DE); Horst Maury, St. Sebastian (DE); Klaus Koch, Dahlheim (DE); Stefan Völpel, Koblenz (DE); Rolf Mintgen, Thuür (DE)

(73) Assignee: Stabilus GmbH, Koblenz (DE)

( * ) Notice: Subject to any disclaimer, the term of this patent is extended or adjusted under 35 U.S.C. 154(b) by 0 days.

(21) Appl. No.: 09/935,902

(22) Filed: Aug. 23, 2001

(65) Prior Publication Data

US 2002/0044820 A1 Apr. 18, 2002

(30) Foreign Application Priority Data

Aug. 23, 2000 (DE) .......................................... 100 41 265

(51) Int. Cl.⁷ ................................................ F16C 11/06
(52) U.S. Cl. ....................................... 403/137; 403/138
(58) Field of Search ................................ 403/144, 137, 403/135, 138, 122

(56) References Cited

U.S. PATENT DOCUMENTS

| | | | | | |
|---|---|---|---|---|---|
| 1,868,891 A | * | 7/1932 | Faudi | ....................... | 384/203 |
| 1,996,826 A | * | 4/1935 | Ohmart | ....................... | 403/144 |
| 2,500,669 A | * | 3/1950 | Doeg | ....................... | 403/144 |
| 2,635,906 A | * | 4/1953 | Graham et al. | ....................... | 403/134 |
| 2,856,250 A | * | 10/1958 | Thoma | ....................... | 403/144 |
| 3,787,128 A | * | 1/1974 | Maistrelli | ....................... | 403/122 |
| 3,941,493 A | * | 3/1976 | Lagnitre | ....................... | 403/122 |
| 4,118,131 A | * | 10/1978 | Schnitzius | ....................... | 200/61.62 |
| 4,435,101 A | | 3/1984 | Sugiyama et al. | ....................... | 403/122 |
| 4,527,925 A | * | 7/1985 | Bauer et al. | ....................... | 280/513 |
| 4,895,472 A | * | 1/1990 | Dony et al. | ....................... | 403/134 |
| 5,653,548 A | * | 8/1997 | Amdahl | ....................... | 403/122 |
| 5,865,558 A | * | 2/1999 | Cebollero | ....................... | 403/133 |
| 6,199,526 B1 | * | 3/2001 | Knickerbocker | ....................... | 123/90.39 |

FOREIGN PATENT DOCUMENTS

| | | |
|---|---|---|
| DE | 659 600 | 4/1938 |
| DE | 77 09 622 | 7/1977 |
| DE | 42 26 986 | 2/1994 |
| DE | 197 44 796 | 5/1999 |

* cited by examiner

Primary Examiner—James R. Brittain
(74) Attorney, Agent, or Firm—Cohen, Pontani, Lieberman & Pavane

(57) ABSTRACT

A spring element exerts a radial force on a pivotable ball head and thereby prestresses it in a ball cup, the spring element being formed by a leaf spring which extends along the lengthwise axis of the ball head and whose active line of force is directed toward the ball cup below the equator of the ball head.

5 Claims, 2 Drawing Sheets

BALL JOINT ASSEMBLY FOR A PISTON- AND CYLINDER UNIT

BACKGROUND OF THE INVENTION

1. Field of the Invention

The invention relates to a ball joint assembly in accordance with the preamble of patent claim 1.

2. Description of the Related Art

DE 42 26 986 discloses a ball joint assembly comprising a pivotable ball head within a ball cup, a spring element exerting a radial force on the ball head and thereby prestressing it in the ball cup. The spring element is formed as a disk spring which is retained in a pocket of the ball cup together with a small plate as a supporting member. Two rows of disk springs with small plates are provided, the spring forces being directed toward the center of the ball head.

DE-GM 77 09 622 describes a ball joint assembly whose ball cup is formed in a plurality of parts and is prestressed by a spring acting in the axial direction of the ball pin. Apart from the large number of parts, a disadvantage here is that the spring is active in the extraction direction of the ball head.

DE 197 44 796 discloses a joint, especially for a lockable pneumatic spring, in which the joint receives a joint pin in a through aperture. Disposed eccentrically is a leaf spring which ensures compensation of play between the joint pin and the joint aperture.

U.S. Pat. No. 4,435,101 relates to a ball joint whose ball cup consists of two components, each of which consists of a plastic and which are connected to one another by ultrasonic welding.

SUMMARY OF THE INVENTION

It is an object of the present invention to produce a ball joint assembly that achieves compensation of play between the ball cup and the ball head with the simplest possible components.

This object is achieved in a first embodiment of the invention by forming the spring element as a leaf spring which extends along the lengthwise axis of the ball head and whose active line of force is directed toward the ball cup below the equator of the ball head.

The leaf spring acting in the direction of the ball cup permits a very simple, in particular single-component, structure of the ball cup. In the application for a piston-and-cylinder unit in the form of a pneumatic spring, a prestress toward the ball cup exists as a matter of principle. It follows that the force of the leaf spring can be so determined as to resist the extraction of the ball head from the ball cup.

In a further advantageous embodiment of the invention, provision is made for the ball cup, starting from its maximum diameter, to make a transition into an undercut-free cylindrical seating for the ball head. Such a ball cup is particularly easy to produce by injection molding technology.

In order for the leaf spring to have a secured position of installation in the direction of insertion of the ball head and for the force acting on the ball head to be as reproducible as possible, the ball cup comprises an axial retention and securing device for the leaf spring.

A possible form of embodiment for the retention and securing device is that the retention and securing device comprises a groove into which the leaf spring is introduced. For this purpose, the leaf spring has a bead which latches into the groove of the retention and securing device.

According to a further advantageous embodiment, the leaf spring is supported on an outer surface of the cylindrical seating. The advantage of this measure lies in the fact that the ball head can be introduced into the ball cup without counterforce. The leaf spring can subsequently be pushed in and then exerts a prestressing force on the ball head. The installation force is thus independent of the force for extracting the ball head from the ball cup.

In an alternative solution, provision is made for the spring element to be connected to the ball cup and to be formed by at least one plastic segment, which consists of a plastic other than that forming the ball cup.

The advantage of this measure lies in the fact that, first, an optimum material in terms of friction behavior or surface pressure can be selected for the ball cup and secondly that the plastic segment can consist of a plastic that is as elastic as possible. The whole ball cup can be produced by what is known as a two-component injection process.

With a view to obtaining the simplest possible outline, the plastic segment engages as a segment of a circle into the area of the ball cup.

In a further embodiment, a housing of the ball cup comprises at least one transverse aperture intersecting the ball cup and filled, at least in the area of intersection with the ball cup, with the plastic having the property of resilience.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
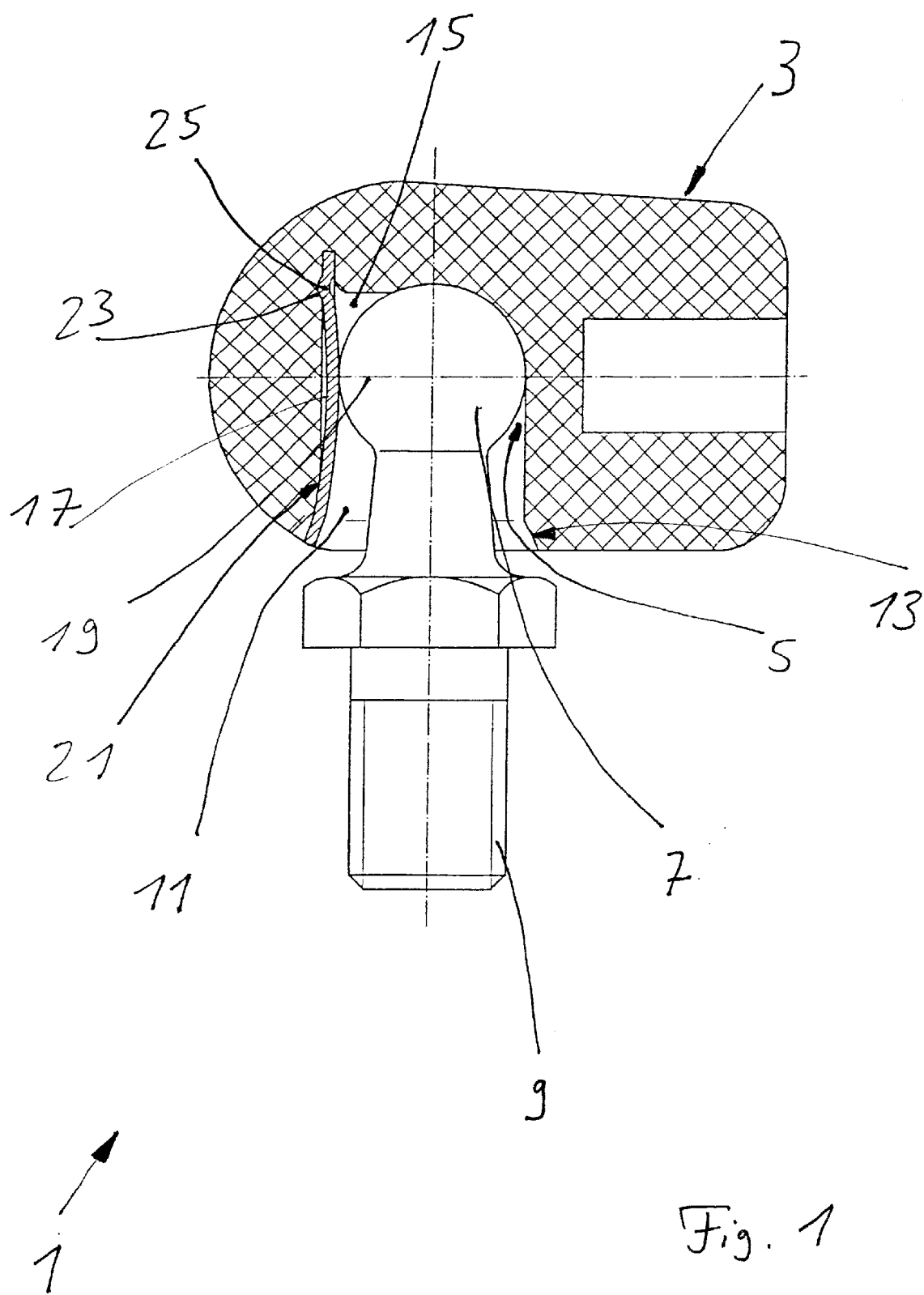
FIG. 1 is a partial side section of a ball joint assembly with a leaf spring.

FIG. 1 shows a ball joint assembly 1 as a single part. Ball joint assemblies 1 are used in pneumatic springs in order to permit a three-dimensional pivot movement of the pneumatic spring. Formed within a housing 3 is a ball cup 5, which supports a ball head 7. The ball head 7 is formed with a securing thread 9 in order to enable it to be screwed, for example, into the bodywork of a motor vehicle.

The ball cup 5 has a seat with an outline resembling a hemisphere, which makes a transition into an undercut-free cylindrical entry 11. For easier introduction of the ball head, an installation ramp 13 is formed in the edge region. The ball cup and the entry have a slot 15, into which is inserted a leaf spring 17 bowed in the direction of the ball head. The line of action of the leaf spring engages below an equator 19 of the ball head 7 and is directed toward the ball cup 5. The ends of the leaf spring are supported on an outer surface 21 of the ball cup and of the seating 11.

In order to ensure that the leaf spring 17 can in no circumstances slide out of the ball cup 5, the ball cup 5 has a retention and securing device that consists of a groove 23, into which a bead 25 of the leaf spring 17 engages.

For assembly, the ball head 7 is introduced into the ball cup 5 and brought into an angular position that permits axial access by the leaf spring to the slit. The leaf spring is then pushed into the slit 15 until the retention and securing device latches between the leaf spring 17 and the ball cup 5. The advantage of this installation possibility lies in the fact that the forces for installing the ball head are relatively independent of the forces for extracting the ball head from the ball cup.

Figure 2:
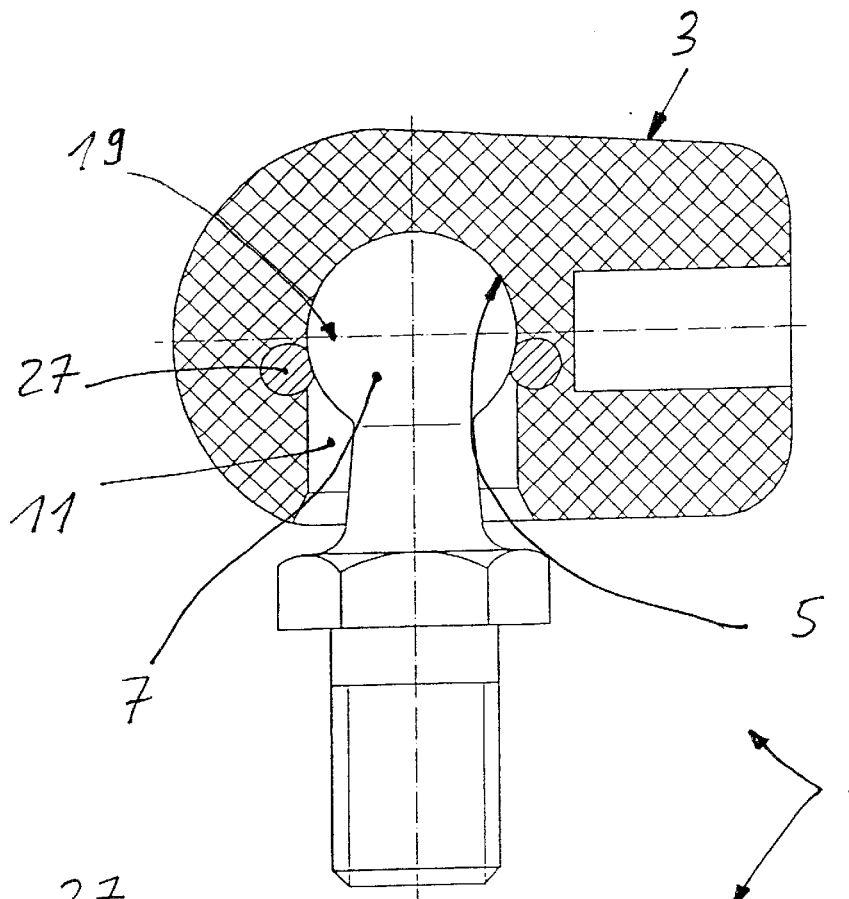
FIG. 2 is a partial side section of a ball joint assembly with injected plastic segments.
Figure 3:
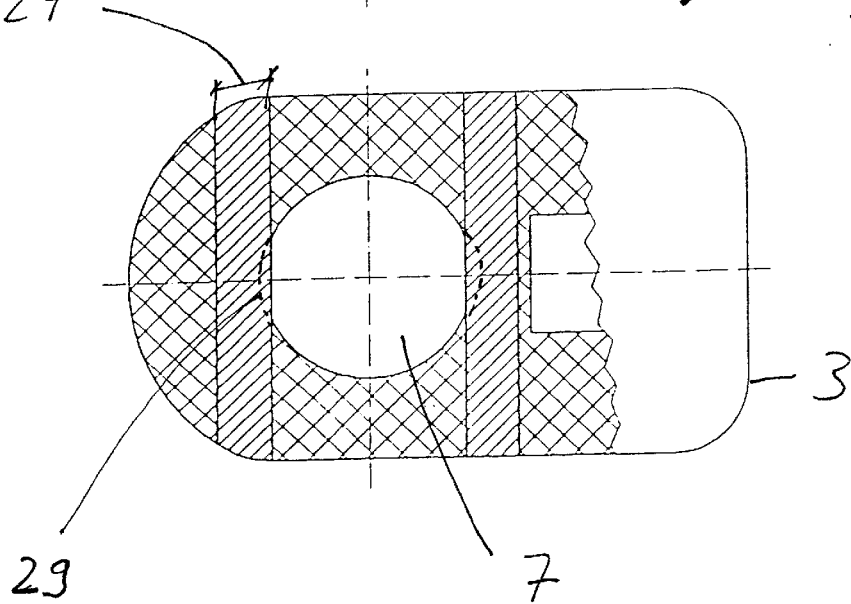
FIG. 3 is a partial top section of the ball joint assembly of FIG. 2.

FIGS. 2 and 3 represent sections through a ball joint assembly 1, in which the housing 3 of the ball cup 5 consists of a plastic that is selected with a view to low friction and high strength. According to FIG. 1, the ball cup 5 is adjoined by a seating 11 for the ball head 7. Below the equator 19 of the ball head 7 are formed two transverse apertures 27 passing through the housing 3 and completely filled with a plastic that is selected to have an elastic behavior. The transverse apertures 27 intersect the ball cup 5, so that plastic segments 29 in the form of segments of cylinders support the ball head 7 within the ball cup 5.

In the production of the ball joint assembly, the housing 3 is initially injection-molded from the first plastic. The ball cup 5 together with seating 11 and transverse apertures 27 are left free by means of appropriate cores. There are two conceivable possibilities for the further course of production.

Either the ball head 7 is pushed into the housing 3 and the second plastics component is injected into the transverse apertures 27 in order to form the spring elements or a mold is formed based on a ball head, the mold is removed and the ball head 7 is then pressed over the plastic segments into the ball cup 5. In both cases a mounting of the ball head 7 in the ball cup 5 free of axial play is achieved.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A ball joint assembly comprising
   a ball cup,
   a pivotable ball head received in said ball cup, said ball head having a longitudinal axis and an equator in a plane transverse to said longitudinal axis,
   a leaf spring which extends along said longitudinal axis of said ball head, said leaf spring having an active line of force directed toward the ball cup below the equator of the ball head, whereby said leaf spring exerts a radial force on said ball head which prestresses it in the ball cup, and wherein said ball cup further comprises means for retaining said leaf spring, said means for retaining said leaf spring comprising a slot for retaining said leaf spring, said leaf spring being introduced into said slot.

2. A ball joint assembly as in claim 1 wherein said ball cup has a substantially hemispherical seat with a maximum diameter, said ball cup further comprising an undercut-free cylindrical entry portion starting from said maximum diameter for introducing said ball head into said seat.

3. A ball joint assembly as in claim 1 wherein said means for retaining said leaf spring further comprises
   a groove extending transversely of said slot, and
   a bead provided on said leaf spring, said bead engaging said groove to retain said leaf spring in said slot.

4. A ball joint assembly as in claim 2 wherein said leaf spring is supported on said cylindrical entry portion.

5. A ball joint assembly comprising
   a housing formed with a ball cup having a pair of transverse bores intersecting said ball cup on opposite sides of said ball cup,
   a pivotable ball head received in said ball cup, said ball head having a longitudinal axis and an equator in a plane transverse to said longitudinal axis, and
   a pair of resilient plastic cylinders received in respective said bores and having an active line of force directed toward the ball cup below the equator of the ball head, whereby said plastic cylinders exert a radial force on said ball head which prestresses it in the ball cup.

* * * * *